United States Patent [19]

Hirokawa

[11] Patent Number: 5,057,998
[45] Date of Patent: Oct. 15, 1991

[54] DATA TRANSFER CONTROL UNIT

[75] Inventor: Masayuki Hirokawa, Hyogo, Japan

[73] Assignee: Mitsubishi Denki Kabushiki Kaisha, Tokyo, Japan

[21] Appl. No.: 593,600

[22] Filed: Oct. 4, 1990

[30] Foreign Application Priority Data

Apr. 14, 1987 [JP] Japan .................................. 62-91195

[51] Int. Cl.[5] ........................ G06F 13/14; G06F 15/16
[52] U.S. Cl. ................................. 364/200; 364/239.7; 364/228.3; 364/260.1
[58] Field of Search ............. 364/200, 900, MS File

[56] References Cited

U.S. PATENT DOCUMENTS

| 4,075,691 | 2/1978 | Davis et al. | 364/200 |
|---|---|---|---|
| 4,112,490 | 9/1978 | Pohlman et al. | 364/200 |
| 4,181,936 | 1/1980 | Kober | 364/200 |
| 4,363,093 | 12/1982 | Davis et al. | 364/200 |
| 4,451,884 | 5/1984 | Heath et al. | 364/200 |
| 4,486,828 | 12/1984 | Kitamura et al. | 364/200 |
| 4,641,238 | 2/1987 | Kneib | 364/200 |
| 4,700,292 | 10/1987 | Campanini | 364/200 |
| 4,724,520 | 2/1988 | Athanas et al. | 364/200 |
| 4,764,896 | 8/1988 | Freimark et al. | 364/900 |
| 4,796,232 | 1/1989 | House | 364/900 |

OTHER PUBLICATIONS

"16-Bit MC68120 Microprocessor's User's Manual", 2nd Ed., Motorola Semiconductors Japan Inc., '81.

Primary Examiner—Allen R. MacDonald
Assistant Examiner—Debra A. Chem
Attorney, Agent, or Firm—Townsend and Townsend

[57] ABSTRACT

In case of performing the data transfer between 2 systems respectively operating under different CPUs, it has been traditionally done through I/O interface, and the control of the I/O interface has been done by said CPU.

The present invention has been made to implement the data transfer between 2 systems using the data transfer interface equipped with the controller to give and take the dual port memory, and the data between the dual port memory and the outside. Writing from the outside into the dual port memory in this case has been made to be indicated by the flag 1, by which the load of the data transfer of CPU itself is to be retrenched.

5 Claims, 6 Drawing Sheets

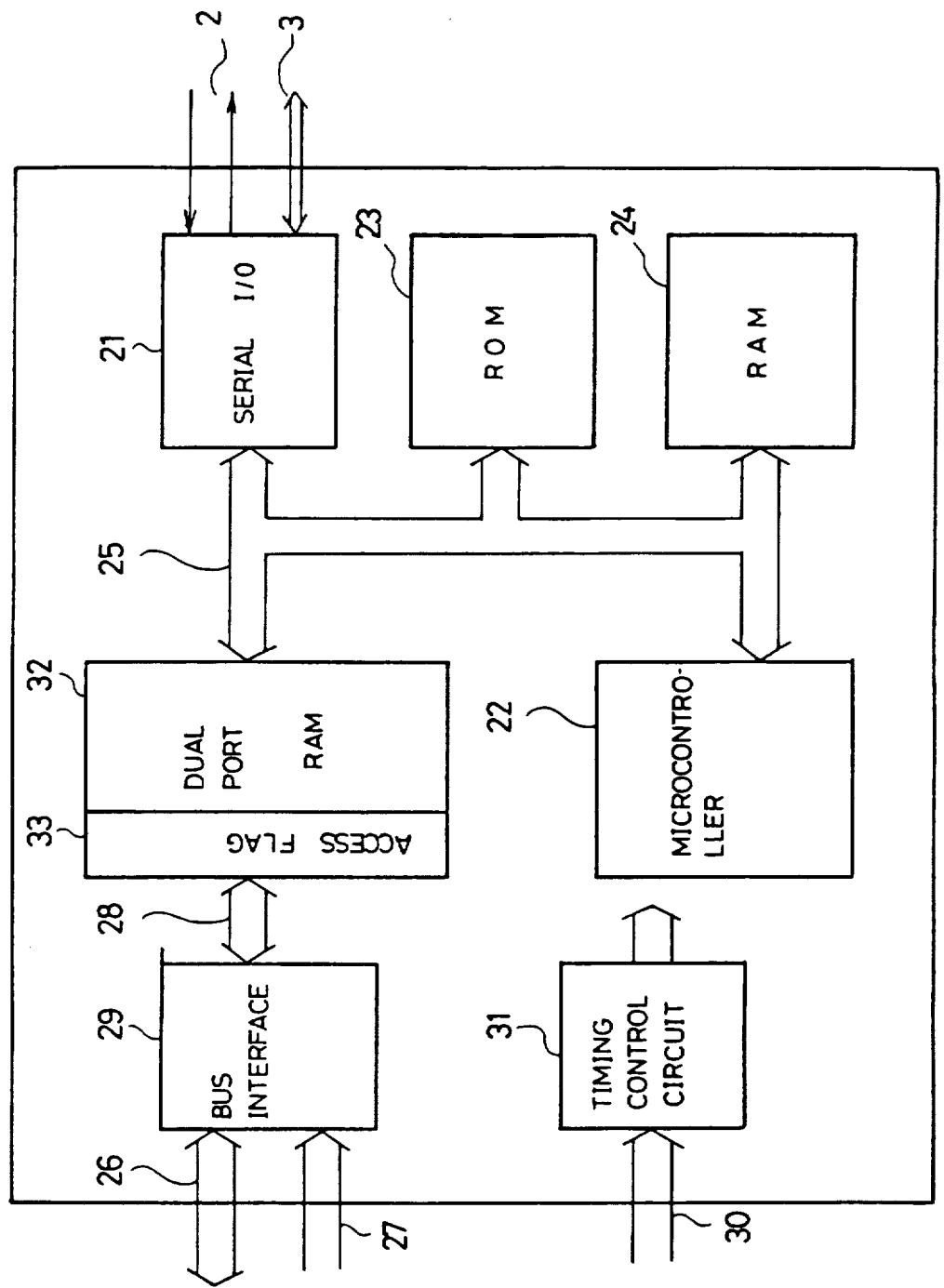

DATA TRANSFER CONTROL UNIT

This is a division of application Ser. No. 07/158,430, filed Feb. 22, 1988, now abandoned.

BACKGROUND OF THE INVENTION

The present invention refers to a data transfer control unit when doing data transfer between 2 systems which are respectively at operation, for example, under any different CPU, and particularly to an available data transfer control unit when doing serial data transfer.

FIG. 8 shows a block diagram of 2 data transfer control unit each to perform serial data transfer, in which 1, 1a show systems respectively performing their operation under any different CPU; 2 shows a signal line to conduct serial communication between the 2 systems; 3 shows a control line to control said communication.

Besides, 4, 4a show CPUs (central processing units); 5, 5a show ROMs in which is held a program dedicated for reading these systems 1, 1a; 6, 6a show RAM in which CPUs 4, 4a write and read the program and data in operation followed by the program to be held in ROMs 5, 5a; 7, 7a show serial I/O interfaces to perform communication between the systems 1, 1a; 8, 9 show other I/O interfaces to connect peripheral equipment, such as keyboard, CRT, etc. other than said serial I/O interfaces; and 10, 10a show system buses to send out address signals, data signals, and control signals to connect CPUs 4, 4a to a peripheral LSI of said serial I/O interfaces 7, 7a, etc.

Their operation will be exemplified as below: Both systems 1 and 1a are to make stand-alone operation according to the programs which have been held in ROMs 5, 5a.

CPUs 4, 4a load the program from ROMs 5, 5a through the system buses 10, 10a and read/write on RAMs 6, 6a according to its need during execution of the program. In addition, the states of I/O interfaces 8, 9, etc. are to be monitored via the system buses 10, 10a processing in response to each state. When information exchange comes to its need between each system 1 and 1a in a certain state, CPUs 4, 4a will use the serial I/O interfaces 7, 7a.

In case of sending the information from one system to the other system, CPU 4 begins with checking for the feasibility of transmitting from the serial I/O interface 7, and in case of infeasibility, it has to wait for its feasibility. Then, upon informing of sending the signals to the opposite side using the control signals 3, it will command to send out the data to the serial I/O interface 7.

The serial I/O interface 7 receives the command from CPU 4, and outputs the data to the signal line 2.

The serial I/O interface 7a on the other system 1a receives the data, either informs CPU 4a of termination of receiving signals by means of interrupt signals, or stands the internal flag. Upon recognition that CPU 4a receives the data by receiving the interrupt signals or by monitoring the flag status of the serial I/O interface 7a, it reads the information from the system 1 by means of the serial I/O interface 7a, with its need, the information will be held into RAM 6 for its processing.

In case of sending plural data, this is to be repeated. Also the case of sending the data from the system 1a to the system 1 will be done in the same procedure.

The traditional data transfer being done as mentioned above, in case of making the data transfer, CPUs 4, 4a of each system 1, 1a will be unable to dedicate for processing I/O interfaces 8, 9, etc. of each system, resulting in being occupied with large processing time of controlling the serial I/O interfaces 7, 7a for effecting communication between both systems. Thus, in order to perform a large amount of data information exchange, there have been such problematic points that load of host CPU is large to the extent that any larger processing capability is to be required than for CPUs 4, 4a.

BRIEF DESCRIPTION OF THE DRAWINGS

FIG. 2 shows the detailed block diagram of the data transfer interface;

SUMMARY OF THE INVENTION

Figure 1:
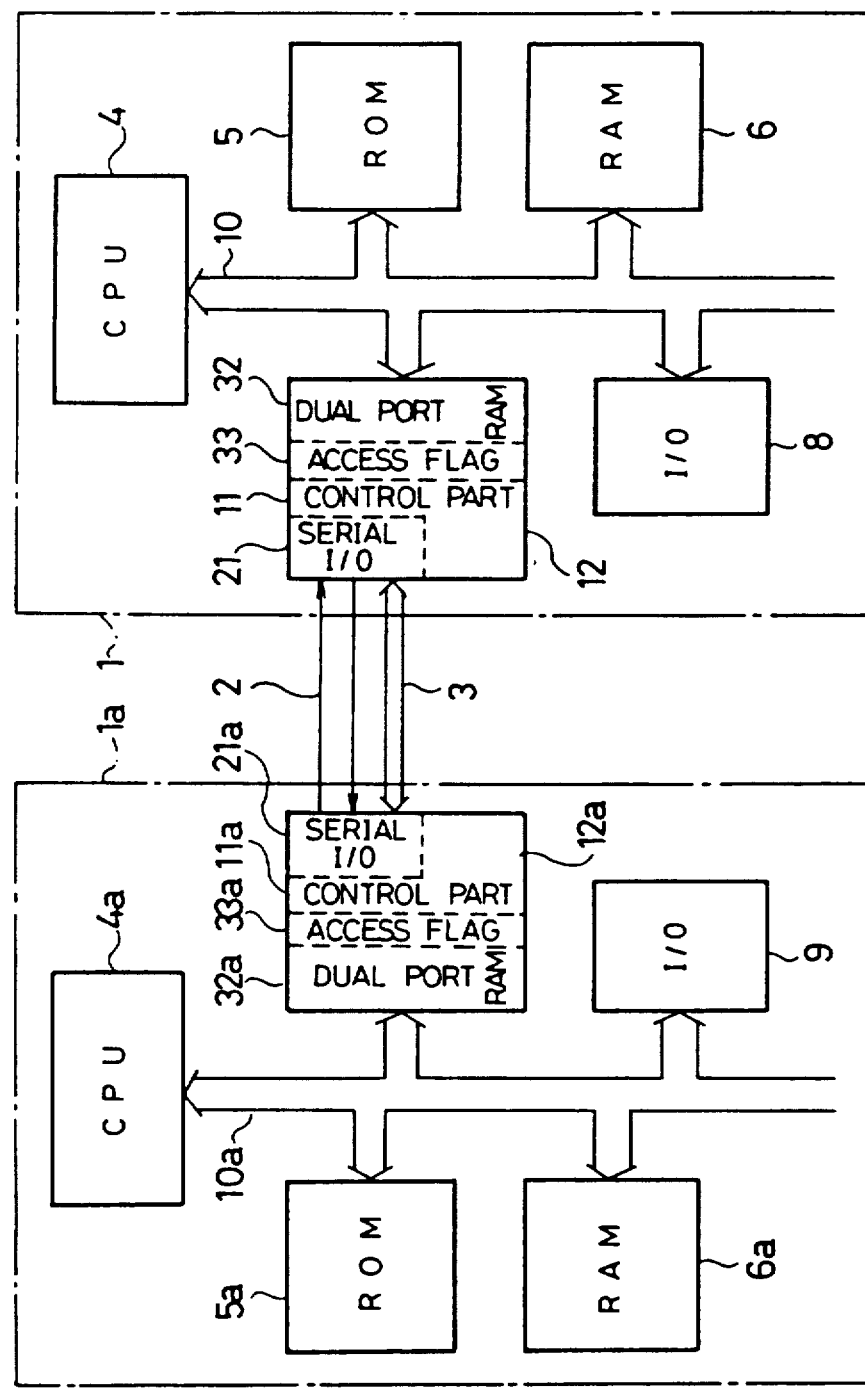
FIG. 1 snows the block diagram of the data transfer control unit indicating one embodiment of the present invention.

The first purpose of the present invention shall rely on obtaining the data transfer control unit to reduce the load of CPU when transferring the data.

The second purpose of the present invention shall rely on making the data to be transferred unilaterally from CPU side possible to be sent out.

The present invention intends to transfer by using the dual port memory for data transfer, and by reading the data written into the dual port memory from CPU side.

Other objects, features, and advantages of the invention will be apparent from the following description taken in conjunction with the accompanying drawings.

One embodiment of the invention will be explained on the drawing as below.

Figure 8:
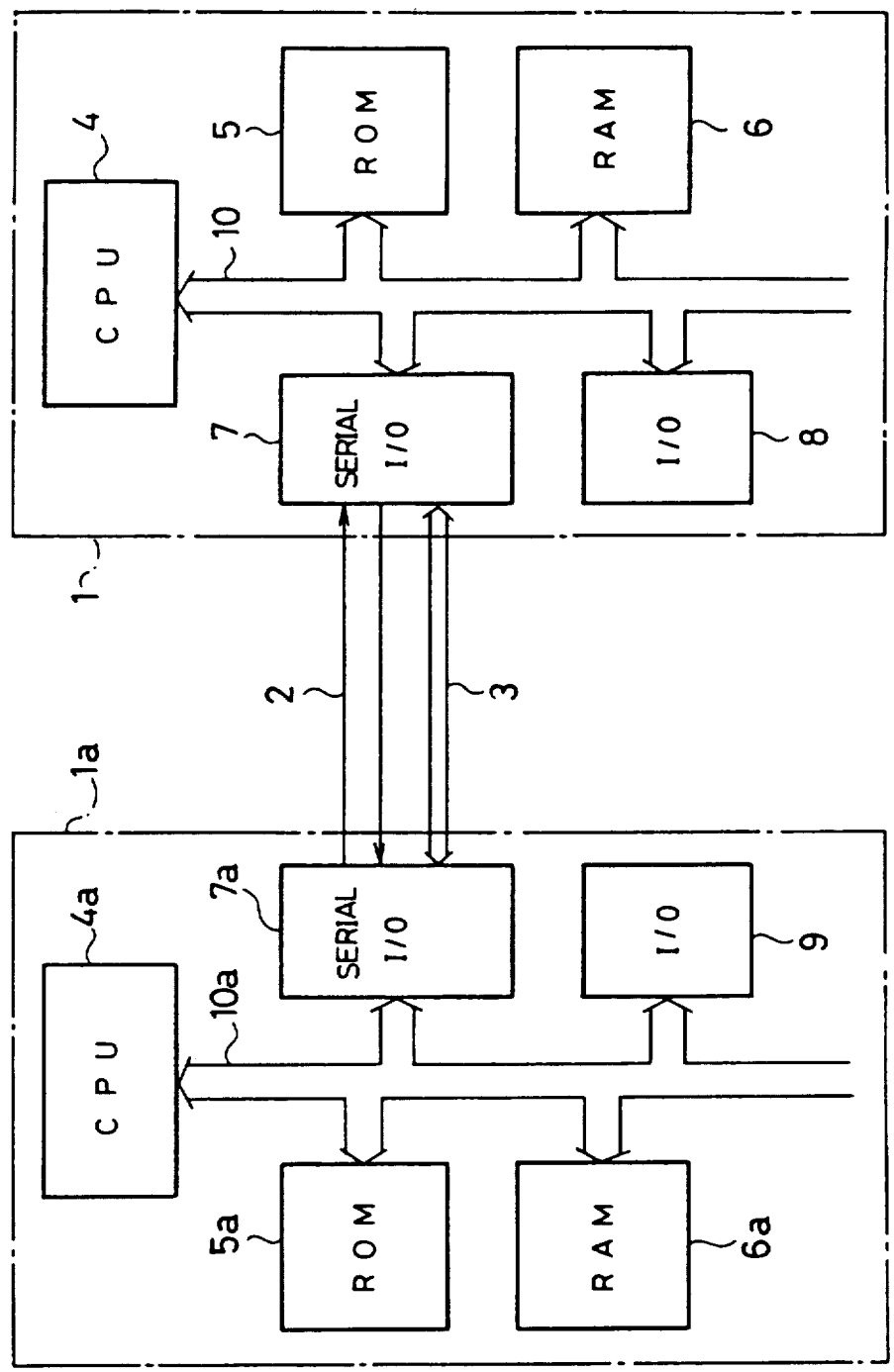
FIG. 8 shows the block diagram of the traditional system to have been brought into for the purpose of exemplifying the traditional data transfer.

FIG. 1 belongs to a block diagram of the data transfer control unit to show one embodiment of the invention, and in the drawing, the same coding denotes the same portion to be referred to the counterpart in FIG. 8. 11, 11a show the data transfer interfaces.

The data transfer interfaces 11, 11a consist of serial I/O interfaces 21, 21a, dual port RAMs 32, 32a, and control parts 12, 12a.

Besides, FIG. 2 shows a detailed block diagram of the data transfer interface.

In FIG. 2, 21 shows I/O interface to conduct its communication, 2 shows a signal line to conduct input and output of the data to the serial I/O interface, and 3 shows a control line to control the communication.

22 shows a microcontroller consisting of CPU to control the serial I/O interface 21, etc.; 23 shows ROM in which the program or data of the microcontroller 22 is held; 24 shows RAM to be used when controlling the data transfer according to the program written into ROM (23); 25 shows an internal system bus for sending control signals, address signals and data signals out of the microcontroller 22.

26 shows an external address data bus to which are connected the data signals, and address signals from outside.

28 shows a host system bus to have the external signals suited to the internal timing; 29 shows a bus interface for making the timing.

30 shows system control signals of reset signals, etc. to control the LSI; 31 shows a timing control circuit to control the internal operation on the basis of the system control signal 30.

32 shows a dual port RAM to be able to access from both host system bus 28 and internal system bus 25.

33 shows an access flag to indicate the access status of the dual port RAM.

Then, we are going to make explanation for the operation. In FIG. 2, when the microcontroller 22 inside the data transfer interface comes to be able to make operation, it loads the program from ROM 23 through the internal system bus 25, and carries out the movement in the sequence described in the program.

The serial I/O interface 21 is to be set to its specific mode during the operation, resulting in being able to be in the state of transmitting and receiving.

We will make separate explanation in transmitting and receiving as below.

In receiving

The microcontroller 22 shall be searched by polling with software whether the serial I/O interface 21 has finished receiving, or make recognition with interrput signals from the serial I/O interface 21.

Upon recognizing the receiving of the data, said data shall be transiently shunted through the internal system bus 25 to RAM 24, or shall be directly transferred to the dual port RAM 32.

In case of being transiently shunted to RAM 24, after doing preprocessing to the plural receiving data, transfer to the dual port RAM 32 will be made possible.

In transfer of the data to the dual port RAM 32, the access flag 33 in response to its domain shall be set with hardware or software.

In case of sending plural data, the plural access flags shall be set.

In case of reading the receiving data from the host side (external part), to begin with the access flag 33 shall be read through the external address data bus 26 and the external control bus.

Regarding the domain in which is held a new data, since the access flag has been set, what is necessary is to just read the dual port RAM in response to the set flag.

Upon reading the dual port RAM in which the new data is held from the host side, the access flag in response thereto shall be reset with hardware or software.

In transmitting

The data desirable to be transmitted from the host CPU shall be written through the host address data bus 26 and host control bus 27 into the dual port RAM 32.

Then, the access flag 33 in response to the written dual port RAM 32 is also to be set.

When the internal microcontroller 22 recognizes that the transfer data have been written into the dual port RAM 32, it will read the content of the dual port RAM 32 in which the access flag 32 has set, confirm that it should be in the state of making the serial I/O interface 21 possible to be transferred, upon being capable of being transferred, the data that have been read from the dual port RAM 32 will be transferred through the internal system bus 25 to the serial I/O interface 21.

In case where the data that are going to be transferred are to be plural, said movement shall be repeated. The sequence of these transmission and receiving is to be described with the program which has been held in ROM 23.

Then, further elucidation shall cover the detail of the operation related to the present invention.

In FIG. 1, the systems 1, 1a will independently operate pursuant to the program held in ROM 5, 5a. CPUs 4, 4a load the program from ROMs 5, 5a through the system buses 10, 10a, if the occasion arises, they read/write RAMs 6, 6a.

Also, they monitor the statuses of I/O interfaces 9, 10 through the system buses 10, 10a, and implement the processes in response to each status Here, when synchronization and exchange of information comes to be entailed between each system, CPUs 4, 4a use the data transfer interfaces 11, 11a. The transfer data shall be written from the system through the system bus 10 to the dual port RAM 32 (the plural number may be all right as well). Then, the access flag 33 of written dual port RAM shall be set.

The control part 12 views the access flag 33, writes the set dual port RAM 32 on the serial I/O interface 21, and trasmits the data to the system 1a side.

The access flag 33 in response to the then read dual port RAM 32. Upon receiving the data from the serial I/O interface 21, the serial I/O interface 21a informs the control part 12a of the receiving having been completed.

The control 12a reads the receiving data from the serial I/O interface 21a, and writes the dual port RAM 32a. The access flag 33a then to cope with it shall be set likewise. In case of plural data, said movement shall be repeated.

CPU 4a of the system 1a can judge that the content of the dual port RAM 32a in which the access flag 33a has been set shall be the data newly sent.

Hereupon, how to set/reset access flags 33, 33a will be described in detail.

Figure 3:
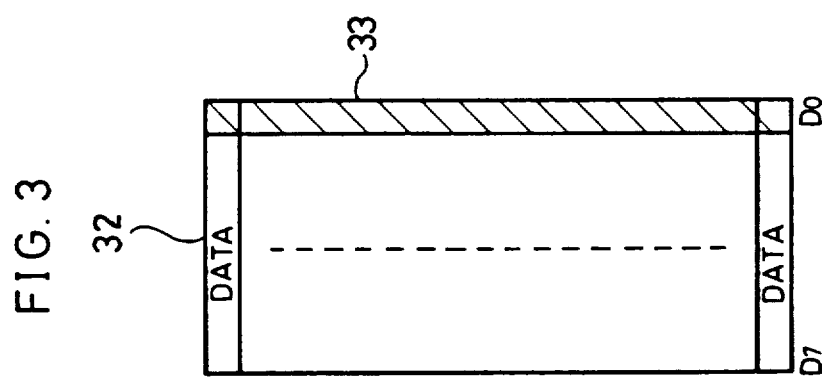
FIG. 3 is a block diagram illustrating, as an example, the access flag of the present invention being set/reset by the software.

FIG. 3 illustrates the arrangement in the dual port RAM 32 when the access flag is set/reset with use of the software. As the figure shows, a specific area in the dual port RAM 32, e.g., the area of the least significant bit is assumed to be an access flag area, with further assumption of 1 bit of this access flag area to be a set state (1 state) or a reset state (0 state), for control of the data transfer. For example, when the CPU 4a writes any data in the dual port RAM 32, the CPU 4a judges whether or not the least significant bits, the access flag area in the dual port RAM 32, i.e., access flag bits are at the reset state (0 state). If so (0 state), the CPU 4a judges the associated data to be writable in the dual port RAM 32, and executes it.

CPU 4a, after writing the data in the dual port RAM 32, sets this flag, and informs the microcontroller 22 of a fact that the data has been stored in the dual port RAM 32. While, the microcontroller 22 supervises the flag bit in the dual port RAM 32. And, it judges, provided the flag bit is at the set state (1 state), the data to be readable from the dual port RAM 32, and transfers the data read from the dual port RAM 32 to the serial I/O interface 21 via the internal system bus 25 upon the serial I/O interface 21a being ready for receiving the data. Thereafter, the microcontroller 22 resets (0 state) the flag bit in the dual port RAM 32.

Figure 4:
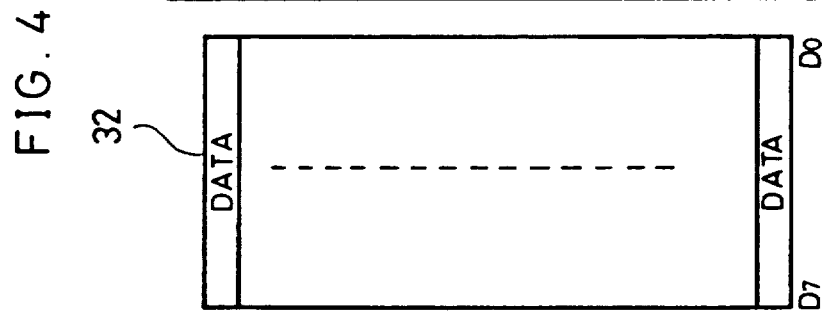
FIG. 4 is a block diagram illustrating, as an example, of the access flag of the present invention being set/reset by the hardware.

In succession, FIG. 4 is a block diagram illustrating the dual port RAM 32 when the set/reset of the access flags 33 and 33a is effected by the hardware. As the figure shows, S-R flip-flops are disposed corresponding to the respective memory addresses in the dual port RAMs 32 and 32a. Hereupon, the CPU 4a, when writing the associated data in the dual port RAM 32, judges whether or not the output Q of the S-R flip-flop is 1, and judges, if it is so, the data to be writable in the dual port RAM 32 and executes it. A data write signal thereupon is applied to the reset terminal of the S-R flip-flop to result in the output Q of the same becoming 0. The microcontroller 22 supervises the state of the output Q of the S-R flip-flop. And, it, once knowing the output Q becoming 0, judges the associated data to be readable from the dual port RAM 32. And further, it, when the serial I/O interface 21a is ready for receiving any data, transfers the data read from the dual port RAM 32 to the serial I/O interface 21 via the internal system bus 25. Thereafter, the microcontroller 22 sets a S-R flip-flop corresponding to an address read from the dual port RAM 32 to thereby make the output Q thereof 1.

Figure 5:
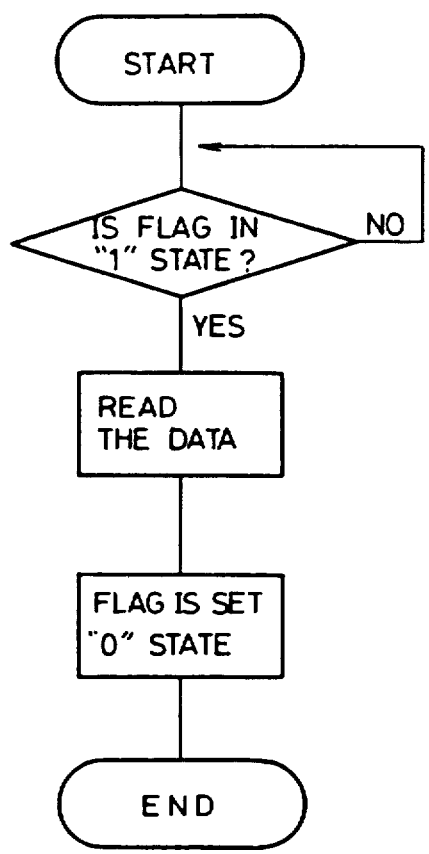
FIG. 5 is a flowchart illustrating the operation of the host CPU of the present invention when writing the associated data into the dual port memory upon its transmitting the data.
Figure 6:
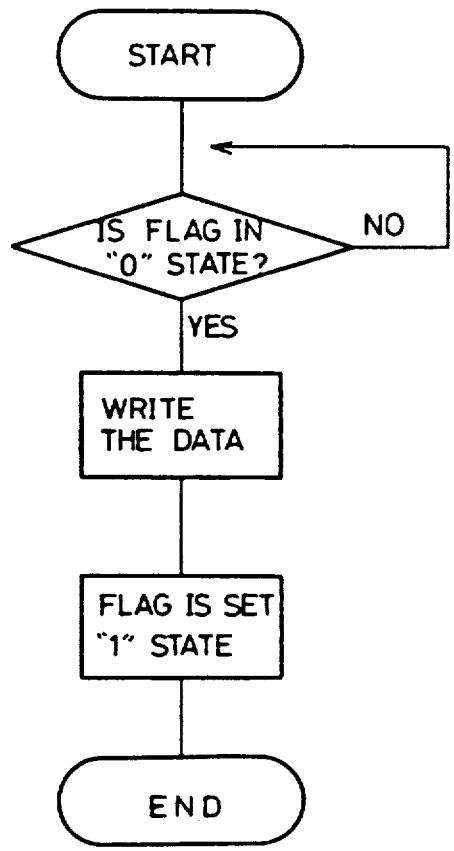
FIG. 6 is a flowchart illustrating the operation of the host CPU of the present invention when reading the associated data from the dual port memory upon its receiving the data.
Figure 7:
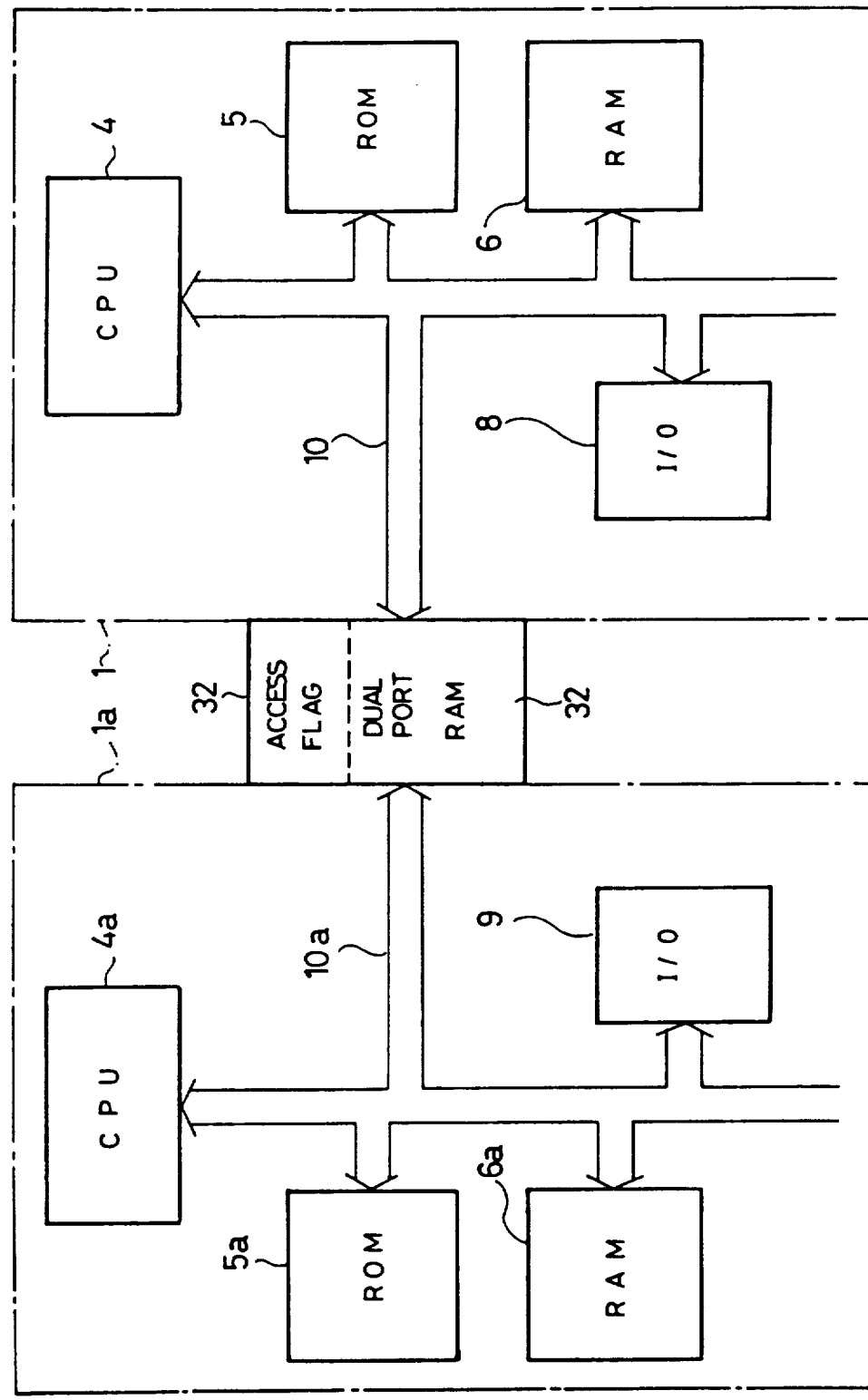
FIG. 7 shows the block diagram indicating the effects of the data transfer control unit according to one embodiment of the present invention.

FIG. 5 illustrates a flowchart of the host CPU (4a), which serves to transmit the associated data, writing the data in the dual port RAM 32a, and FIG. 6 illustrates the like flowchart but of the CPU (4), which serves to receive the associated data, reading the data from the dual port RAM 32. As those figures show, the host CPUs 4a, 4 can transfer any data there between only by their supervision of the flag to read/write the data from-/into the dual port RAMs 32, 32a in conformity with the flag state. That is, they can be operated as if there is existent no communication associated with such data transfer when viewed therefrom.

Such as this, observation from both systems will make it equal to the one that owns the common dual port RAM 32 as shown in FIG. 3. One can judge the access status (new data writing) of other system from the systems on all sides around by particularly providing the access flag 33.

As mentioned above, in the present embodiment, entrusting the data transfer from the host CPU to the data transfer interfaces 11, 11a tenders the effect such that load of the host CPU can be sharply retrenched, since the complicated process of synchronization with the serial I/O interface of other system, synchronization of transmission and receiving of plural data, etc. which the host CPU has been traditionally performed all alone.

Moreover, as all that is necessary for the host CPU is just to write unilaterally the data into the dual port memory, it tenders such an effect to simply produce the program of the data transfer on the host CPU side. In addition, in the above embodiment, though it has shown the one which provides the serial I/O interface and, in which the data transfer is to be done serially, there is an alternative to perform the data transfer in parallel by converting it to a parallel I/O interface.

While the above embodiment is in use of universal CPU as microcontroller, and shows the configuration to control the data transfer pursuant to the program written into ROM, but it will be also all right to configure them with a custom LSI.

Besides, in said embodiment, although it shows the one in which the internal RAM of the data transfer interface has been separated from the dual port RAM, such an alternative may be allowed as to put them together with each other in the common region.

While a preferred embodiment of the invention has been described using specific terms, such description is for illustrative purpose only, and it is to be understood that changes and variations may be made without departing from the spirit and scope of the following claims.

What is claimed is:

1. In a data processing system including a CPU and an I/O unit for transferring data between data processing systems, an improved data transfer control unit for transferring data via an outside bus with an outside source comprising:
   a dedicated controller;
   an internal system bus, coupled to said dedicated controller, for transferring address information, data, and control information;
   a dual ported RAM having a first data port coupled to said internal system bus and a second data port coupled to the CPU and divided into a plurality of storage locations;
   an I/O interface, coupled to the outside data bus and said internal system bus, for transferring data between said internal system bus and the outside data bus under control of said dedicated controller; and
   flag storage means for storing a plurality of flags, each flag corresponding to a storage location in said dual ported RAM, where each flag is set by the CPU when the CPU has written data to each flag's corresponding storage location, and where each flag is reset by said dedicated controller when said dedicated controller transfers said written data from said corresponding storage location to the outside bus via said I/O interface.

2. In a data processing system including a CPU and an I/O unit for transferring data between data processing systems, an improved method for transferring data via an outside bus with an outside source, comprising the steps of:
   providing a serial data transfer control unit including a dedicated controller, an internal system bus, coupled to said dedicated controller, for transferring address information, data, and control information, an external system bus, coupled to the CPU, for transferring address information, data, and control information, a dual ported RAM having a first port coupled to said internal system bus, a second port coupled to said external system bus, and divided into a plurality of storage locations, and I/O interface, coupled to the outside bus and said internal system bus, for transferring data between said internal system bus and the outside bus under control of said dedicated controller, and a flag storage unit for storing a plurality of flags, each flag indicating whether a corresponding storage location has been written;
   checking, using said dedicated controller, whether said I/O interface has received outside data from the outside source transmitted on the outside bus via said I/O interface;
   if said outside data has been received from the outside source, transferring, under control of said dedicated controller, said received outside data to storage locations in said dual ported RAM;

setting, using said dedicated controller, said flags corresponding to the said storage locations to indicate that said received outside data has been stored in said storage locations;

checking, using the CPU, which flags have been set; and reading, using the CPU, in response to said flags having been set, outside data only from storage locations corresponding to flags which are set, so that the CPU is not required to control said I/O interface.

3. In a data processing system including a CPU and an I/O unit for transferring data between data processing systems, an improved method for transferring data via an outside bus with an outside source, comprising the steps of:

providing a serial data transfer control unit including a dedicated controller, an internal system bus, coupled to said dedicated controller, for transferring address information, data, and control information, an external system bus, coupled to the CPU, for transferring address information, data, and control information, a dual ported RAM having a first port coupled to said internal system bus, a second port coupled to said external system bus, and divided into a plurality of storage locations, an I/O interface, coupled to the outside bus and said internal system bus, for transferring data between said internal system bus and the outside bus under control of said dedicated controller, and a flag storage unit for storing a plurality of flags, each flag indicating whether a corresponding storage location has been written;

checking, using said dedicated controller, whether said I/O interface has received outside data from the outside bus via said I/O interface;

if data is to be transferred to an outside source, transferring, under control of the CPU, said data to be transferred to storage locations in said dual ported RAM;

setting, using the CPU, said flags corresponding to the said storage locations to indicate that said data to be transferred has been stored in said storage locations by the CPU;

checking using said dedicated controller, which flags have been set; and transferring, under control of said dedicated controller and in response to said flags having been set, said data to be transferred only from said storage locations corresponding to flags which are set, to said I/O interface for transmission to an outside source to that the CPU is not required to control said I/O interface.

4. The apparatus of claim 1 wherein the flag storage means is included within the dual ported RAM.

5. In a data processing system including a CPU and an I/O unit for transferring data between data processing systems, an improved data transfer control unit for transferring data via an outside bus with an outside source comprising:

a dedicated controller;

an internal system bus, coupled to said dedicated controller, for transferring address information, data, and control information;

a dual ported RAM having a first data port coupled to said internal system bus and a second data port coupled to the CPU and divided into a plurality of storage locations; p1 an I/O interface, coupled to the outside data bus and said internal system bus, for transferring data between said internal system bus and the outside data bus under control of said dedicated controller; and flag storage means for storing a plurality of flags, each flag corresponding to a storage location in said dual ported RAM, where said flag is set by said dedicated controller when said dedicated controller has received data from the outside bus via said I/O interface and written said received data to said flag's corresponding storage location, and where said each flag is reset by the CPU when the CPU has read said received data from said corresponding storage location.

* * * * *